United States Patent Office 2,846,901
Patented Aug. 12, 1958

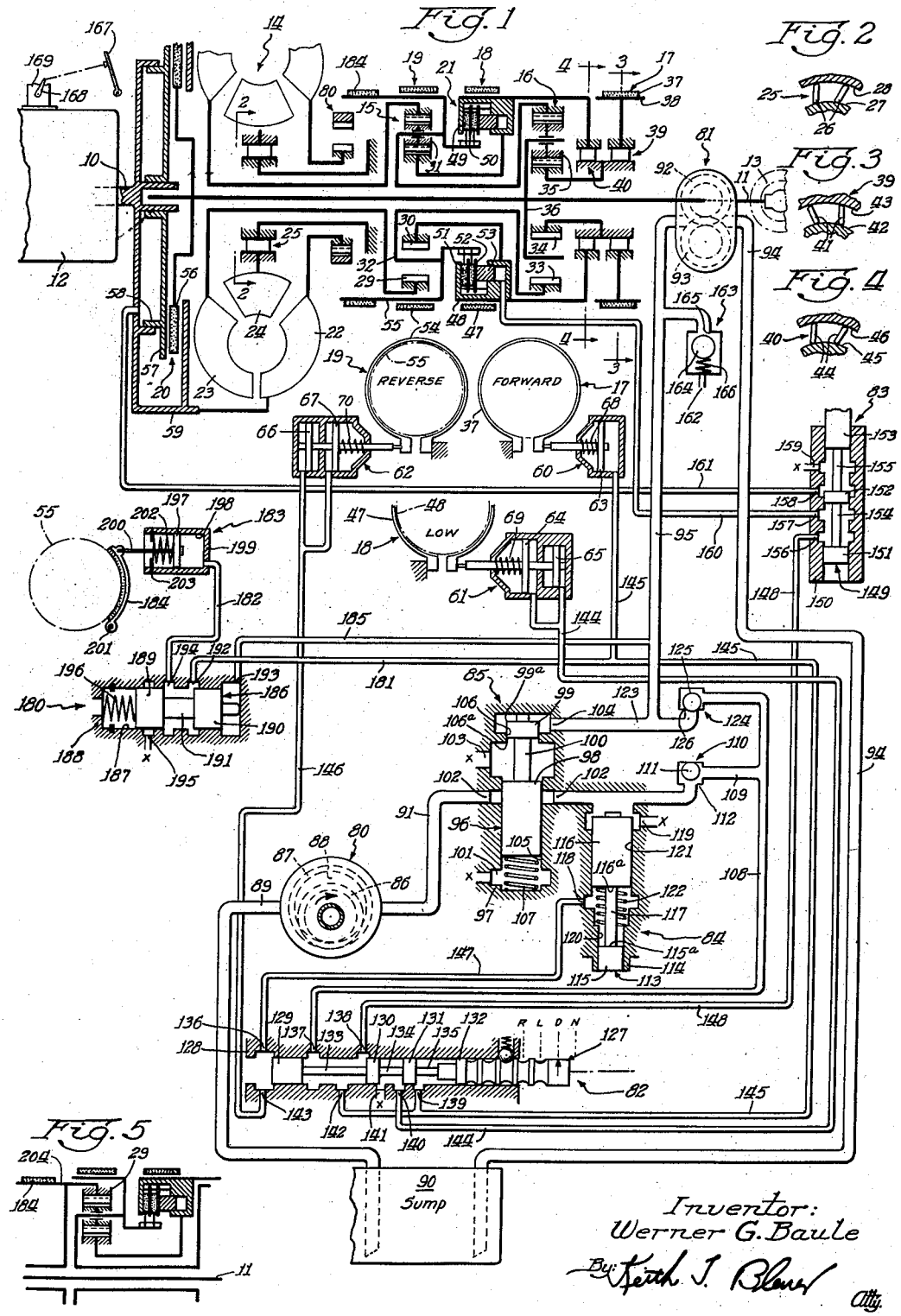

2,846,901

BRAKING SYSTEM

Werner G. Baule, Detroit, Mich., assignor to The Borg-Warner Corporation, Chicago, Ill., a corporation of Illinois Application November 15, 1951, Serial No. 256,490

3 Claims. (Cl. 74—732)

My invention relates to transmissions for automotive vehicles having hydrodynamic torque transmitting devices therein which transmit torque at engine idling speeds as well as at greater speeds of the vehicle engine, and more particularly my invention relates to braking means for counteracting the tendency of the vehicle to creep or move slowly due to the torque transmitted through the hydrodynamic device at engine idling speeds.

Automotive vehicles are quite usually equipped with transmissions comprising such hydrodynamic coupling devices, which may take the form of hydraulic torque converters, the speed and torque output of which is dependent on the speed and torque applied to the coupling device from the engine of the vehicle. A power train including such a hydrodynamic device may be maintained completed through the transmission for all forward driving; however, it has been found that the torque transmitted by the hydrodynamic device with the engine idling, under some conditions, such as when the lubricated parts of the vehicle are warm and therefore move easily, is sufficient to cause the vehicle to move slowly, so that with ordinary installations of this character, it is necessary for the vehicle operator to keep the vehicle wheel brakes applied for preventing creeping of the vehicle due to the torque transmitted through the hydrodynamic device under engine idling conditions.

It is an object of the present invention to provide an improved system which overcomes the tendency of the vehicle to creep under engine idling conditions and prevents any torque being applied to the output shaft of the transmission at engine idling speeds. Automotive transmissions commonly include planetary gearing and brakes for elements of the planetary gearing for completing various power trains through the transmission, and it is a further object of the invention to provide mechanism cooperating with these brakes for preventing torque output through the driven shaft of the transmission under engine idling conditions.

Such transmissions may comprise a brake cooperating with planetary gearing to provide a forward drive through the transmission when the brake is engaged and a second brake engageable with a drum connected with a certain element of the planetary gearing for providing a reverse drive through the transmission when the latter brake is engaged, and it is an object to provide an additional brake for the last named element which is smaller and has less braking effect than the second brake and which engages together with the forward drive brake to simultaneously complete the forward drive power train and also a reverse drive power train from the hydrodynamic device to the output shaft of the transmission for preventing rotation of and torque output through the driven shaft of the transmission. It is contemplated that the application of the small brake shall be vehicle speed controlled so that the brake is automatically disengaged when the speed of the vehicle increases above a predetermined value.

It is a further object of the invention to provide a modification of the invention in which a small sized brake, instead of being used on the reverse drive drum, is instead used directly on the output element of the hydrodynamic coupling device.

The invention consists of the novel constructions, arrangements and devices to be hereinafter described and claimed for carrying out the above stated objects and such other objects as will appear from the following description of preferred embodiments of the invention, illustrated with reference to the accompanying drawings, wherein:

Fig. 1 is a schematic illustration of a transmission and a controlling system for the transmission embodying the principles of the invention;

Figs. 2, 3 and 4 are sectional views taken respectively on line 2—2, 3—3 and 4—4 of Fig. 1; and Fig. 5 is a schematic illustration of a portion of a transmission controlling system embodying the principles of the invention.

This invention constitutes an improvement on the vehicle braking systems disclosed in an application by John B. Polomski, Serial No. 230,489, filed June 8, 1951, and in my co-pending application, Serial No. 249,335, filed October 2, 1951, now Patent No. 2,679,768, dated June 1, 1954.

Like characters of reference designate like parts in the several views.

Referring now to the drawings, the transmission illustrated comprises a drive shaft 10 and a driven shaft 11. The drive shaft 10 is adapted to be driven by the engine 12 of the vehicle in which the transmission is installed, and the driven shaft 11 is adapted to drive the rear road wheels 13 of the vehicle through any suitable drive connections.

The transmission comprises in general a hydraulic torque converter 14, a planetary gear set 15, a second planetary gear set 16, a forward drive brake 17, a low speed lockup brake 18, a reverse brake 19, a high speed forward drive clutch 20 and an intermediate speed clutch 21.

The hydraulic torque converter 14 comprises a bladed impeller 22, a bladed runner or driven element 23 and a bladed stator or reaction element 24. The impeller is connected to be driven from the drive shaft 10. The stator 24 is connected with a one-way brake 25 which is effective for holding the stator 24 against rotation in the reverse direction, that is, in the direction of rotation opposite to that of the drive shaft 10. The brake 25 may be of any suitable construction and may, for example, comprise tiltable sprags 26 disposed between and engageable with inner and outer cylindrical raceways 27 and 28 as shown in Fig. 2.

The planetary gear set 15 comprises a ring gear 29, a sun gear 30, a plurality of planet gears 31 in mesh with the sun and ring gears and a planet gear carrier 32 for the planet gears 31. The second planetary gear set 16 comprises a ring gear 33, a sun gear 34, a plurality of planet gears 35 in mesh with the sun and ring gears and a planet gear carrier 36. The ring gear 29 of the first planetary gear set is connected to be driven by the runner 23 of the torque converter 14, and the planet gear carrier 32 of this gear set is connected with the ring gear 33 of the second planetary gear set 16. The planet gear carrier 36 of the second gear set is connected with the driven shaft 11.

The friction brake 17 comprises a brake band 37 engageable with a drum 38, and the brake 17 is effective through a one-way brake 39 for braking the sun gear 34 and is effective through a second one-way brake 40 as well as the first one-way brake 39 disposed in series with the brake 40 for braking the sun gear 30. The one-way brakes 39 and 40 may be of any suitable well-known construction and may be of the sprag type similar to the brake 25. The one-way brake 39 comprises sprags 41 engageable with inner and outer cylindrical surfaces 42 and 43, and the brake 40 comprises sprags 44 engageable between inner and outer cylindrical races 45 and 46. Looking in the same direction at the brakes 39 and 40, the sprags of the two brakes are disposed in opposite directions between the inner and outer races as is apparent from Figs. 3 and 4.

The brake 18 comprises a brake band 47 engageable on a brake drum 48 for augmenting the braking action of the one-way brakes 39 and 40 and the friction brake 17 on the sun gear 30. The friction clutch 21 comprises discs 49 rotatable with the planet gear carrier 32, discs 50 rotatable with the sun gear 30, opposite pressure plates 51 and 52, and a fluid pressure actuated piston 53 for moving the plate 52 toward the plate 51 to frictionally engage the two sets of friction discs with each other for engaging the clutch 21.

The reverse brake 19 comprises a brake band 54 engageable with a brake drum 55 connected with the carrier 32 of the planetary gear set 15 and with the ring gear 33 of the planetary gear set 16. The clutch 20 comprises a clutch disc 56 connected with the driven shaft 11 and an axially movable pressure plate 57 having a fluid pressure actuated piston portion 58 and an axially stationary pressure plate 59 both rotatable with the drive shaft 10 and between which the disc 56 is engaged.

Each of the brakes 17, 18 and 19 is engaged by a fluid pressure actuated servomotor, the brakes 17, 18 and 19 being respectively engaged by servomotors 60, 61 and 62. The servomotor 60 comprises a fluid pressure actuated piston 63 for engaging the brake band 37 on the drum 38; the servomotor 61 comprises fluid pressure actuated pistons 64 and 65 for engaging the brake band 47 on the drum 48; and the servomotor 62 comprises pistons 66 and 67 for engaging the brake band 54 on the drum 55. Return springs 68, 69 and 70 are provided in the motors 60, 61 and 62 respectively for disengaging the bands from the drums.

In operation, the transmission provides low, intermediate and direct forward speed drives and a drive in reverse. The transmission, when the clutches 20 and 21 and the brakes 17, 18 and 19 are all disengaged, is in a neutral condition, and the shaft 11 is not driven from the shaft 10 when the latter is rotated by the engine 12. The low speed forward drive may be completed by engaging the brakes 17 and 18. The sun gear 34 is braked by means of the friction brake 17 and the one-way brake 39 from rotation, and the sun gear 30 is braked both by the friction brake 18 and the one-way brake 40 from the sun gear 34. The runner 23 in the torque converter 14 is driven through the medium of the fluid in the torque converter from the impeller 22 and the drive shaft 10, and the runner 23 drives the ring gear 29 of the gear set 15. The sun gear 30 of this gear set is braked to be stationary, as has just been described, and the planet gears 31 planetate between the sun gear 30 and ring gear 29 to drive the carrier 32 at a reduced speed and increased torque in the forward direction. The ring gear 33 of the second plantary gear set 16 is connected with the carrier 32 and is driven thereby. The sun gear 34 of the gear set 16 is braked to be stationary, as has just been described, and the planet gears 35 of this gear set planetate between the ring gear 33 and the sun gear 34 and drive the planet gear carrier 36, which is connected with the driven shaft 11, at a further reduced speed and increased torque in the forward direction. The driven shaft 11 is thus driven at an increased torque with respect to that impressed on the drive shaft 10, an increase in torque taking place in each of the hydraulic torque converter 14, the planetary gear set 15 and the planetary gear set 16.

Intermediate speed forward drive through the transmission is completed by disengaging the brake 18 and engaging the clutch 21. The clutch 21 connects together the planet gear carrier 32 and the sun gear 30 of the planetary gear set 15 thereby locking up the gear set and causing all of its elements to rotate together as a unit. The ring gear 33 of the second planetary gear set 16 is thereby driven from the runner 23 at the same speed as the runner, and the speed of the driven shaft 11 is thereby increased with respect to its speed in low speed forward drive.

Direct drive through the transmission is completed by engaging the clutch 20 which directly connects together the drive shaft 10 with the driven shaft 11. Both the clutch 21 and the brake 17 may be allowed to remain in engaged condition for this drive.

Reverse drive is completed through the transmission by engaging the reverse brake 19. The brake 19 functions to hold stationary the planet gear carrier 32 of the gear set 15 and the ring gear 33 of the gear set 16 connected with the carrier 32. The ring gear 29 is driven as in the forward drives through the hydraulic torque converter 14 from the drive shaft 10, and the sun gear 30 is driven at an increased speed in the reverse direction through the intermediary of the planet gear pinions 31 held against planetary rotation about the centers of the shafts 10 and 11 by the brake 19. The sun gear 30 drives the sun gear 34 of the planetary gear set 16 through the one-way brake 40 which now functions as a clutch. The ring gear 33 of the gear set 16 being held stationary by the reverse brake 19 functions as the reaction element of the gear set 16 to cause a drive of the planet gear carrier 36 and thereby the driven shaft 11 in the reverse direction as a speed which is reduced below the speed of the sun gear 30 due to the action of the planet gear pinions 35 rotating within the ring gear 33.

The control mechanism for the transmission comprises in general a pump 80 driven by the drive shaft 10 of the transmission, a pump 81 driven by the driven shaft 11 of the transmission, a manual selector valve 82, a direct drive shift valve 83, a front pump relief valve 84, and a rear pump relief valve 85.

The drive shaft pump 80 comprises an inner gear 86 driven through the intermediary of the impeller 22 of the torque converter 14 from the drive shaft 10 and an outer gear 87 eccentrically located with respect to the inner gear 86 and in mesh with the latter gear. A crescent shaped casing portion 88 separates the gears 86 and 87, as shown. The pump 80 is connected with an inlet conduit 89 and thereby with a fluid sump 90, and the pump is also connected with an outlet conduit 91. The pump is of a well-known construction and operates as is well understood to pump fluid from the conduit 89 to the conduit 91 when the inner gear 86 is rotated in the direction indicated by the arrow on the gear and the outer gear 87 rotates in the same direction due to its meshing engagement with the gear 86, the pumping action being due to the fluid carried by the gears 86 and 87 across the inner and outer faces of the crescent shaped casing portion 88.

The driven shaft pump 81 comprises a gear 92 driven by the driven shaft 11 in mesh with a gear 93. The pump 81 is connected with an inlet conduit 94 which is connected to draw fluid out of the sump 90, and the pump is connected with an outlet conduit 95. The pump 81 also is of well-known construction and operation, carrying fluid between its gear teeth to provide its pumping action.

The outlet conduit 91 of the drive shaft pump 80 is connected with the rear pump relief valve 85, as shown. The valve 85 comprises a piston 96 slidably disposed in a casing portion 97. The piston 96 has lands 98 and 99 and a groove 100 between the lands. The casing portion 97 is provided with a port 101, two connected ports 102, a port 103 and a port 104, as shown, and it has connected cavities 105 and 106 of respectively larger and smaller diameters in which the lands 98 and 99 are respectively slidable. A compression spring 107 is provided between the lower end of the piston 96 and the lower end of the cavity 105.

A regulated fluid pressure supply conduit 108 is connected by means of a branch conduit 109 with the ports 102 and the outlet conduit 91 for the pump 80. A check valve 110 comprising a ball 111 adapted to rest on a seat 112 is provided in the conduit 109 for allowing fluid to flow through the conduit in only one direction. The ports 101 and 103 of the valve 85 are bleed ports adapted to freely discharge fluid into the sump 90.

The front pump relief valve 84 is connected with the conduit 109, as shown, and comprises a piston 113 slidably disposed in a casing portion 114. The valve piston 113 comprises lands 115 and 116 and a groove 117 between the lands. The casing portion 114 has ports 118 and 119 as shown, the port 119 being a bleed port for freely discharging fluid into the sump 90. The casing portion 114 has cavities 120 and 121 of respectively smaller and larger diameters in which the lands 115 and 116 are respectively slidable, and the cavity 121 at its upper end is connected to the conduit 109. A spring 122 is provided between the land 116 and the upper edge of the cavity 120.

The outlet conduit 95 for the pump 81 is connected with the port 104 in the valve 85, and this conduit is also connected with the regulated pressure conduit 108 by means of a branch conduit 123. A check valve 124 is provided in the conduit 123 and comprises a ball 125 adapted to rest on a seat 126.

The regulated fluid pressure conduit 108 is connected with the manual selector valve 82. The valve 82 comprises a valve piston 127 slidably disposed in a casing portion 128. The piston 127 is provided with lands 129, 130, 131 and 132 and grooves 133, 134 and 135 between the lands. The casing portion is provided with ports 136, 137, 138, 139, 140, 141, 142 and 143. The port 141 is a bleed port through which fluid may freely discharge into the sump 90, and the port 137 is connected with the regulated fluid pressure conduit 108. The port 140 is connected by means of a conduit 144 with the brake servomotor 61 for applying fluid pressure at times to the pistons 64 and 65. The ports 139 and 142 are connected by means of a conduit 145 with the brake servomotor 60 for applying pressure at times to the piston 63, and the port 143 is connected by means of a conduit 146 with the brake servomotor 62 for applying pressure to the pistons 66 and 67. The port 136 is connected to the port 118 in the front pump relief valve 84 by means of a conduit 147.

The port 138 in the selector valve 82 is connected by means of a conduit 148 with the direct drive shift valve 83. The valve 83 comprises a valve piston 149 slidably disposed in a casing portion 150. The piston 149 is provided with lands 151, 152 and 153 and grooves 154 and 155 between the lands. The casing portion 150 is provided with ports 156, 157, 158 and 159. The port 159 is a bleed port adapted to freely discharge fluid into the sump 90; the port 156 is connected with the conduit 148; the port 157 is connected by means of a conduit 160 with the pressure piston 53 of the friction clutch 21; and the port 158 is connected by means of a conduit 161 with the pressure plate piston portion 58 of the friction clutch 20. The piston 149 of the direct drive shift valve may be moved manually or by any suitable automatic means (not shown).

A restricted drain passage 162 is connected with the discharge conduit 95 for the driven shaft pump 81. A check valve 163 is disposed between the restricted passage 162 and the discharge conduit 95 and comprises a ball 164 adapted to rest on a seat 165 and yieldably held thereon by means of a spring 166.

The engine 12 for automotive vehicle is controlled in accordance with usual practice by means of an accelerator 167 which is connected with the throttle lever 168 of the engine carburetor 169.

The operation of the transmission and its controls as so far described is as follows: The transmission is conditioned for various types of operation by moving the manually operated selector valve piston 127 into any of its various positions which are the "N" or neutral position, the "D" or drive range position, the "L" or low range position and the "R" or reverse drive position, all of which are indicated in the drawing. When the valve piston 127 is in its "N" or neutral position, there is no drive between the shafts 10 and 11. It is assumed that the vehicle engine 12 is in operation, and the pump 80 which is driven through the impeller 22 from the drive shaft 10 draws fluid from the sump 90 through the conduit 89 and discharges it into the conduit 91. It flows between the opposite ports 102 in the valve 85 and through the conduit 109 into the regulated fluid pressure supply conduit 108. The check valve 110 is opened by the fluid from the pump 80 with the ball 111 being moved off the seat 112 to provide communication through the conduit 109 to the conduit 108. The pressure in the conduits 109 and 108 is maintained at a predetermined maximum by means of the front pump relief valve 84. The pressure in the conduit 109 is impressed on the upper end of the valve piston 113 and moves the valve piston 113 into substantially its illustrated port cracking position in which the land 116 allows fluid from the conduit 109 to flow through the bleed port 119 and thereby to the sump 90, this movement of the valve piston 113 into port cracking position being against the action of the spring 122. As will be apparent, a decrease in fluid pressure in the conduit 109 will allow the piston 113 to move upwardly under the influence of the spring 122 to decrease the port cracking effect of the land 116, and an increase in the fluid pressure in the conduit 109 functions to move the valve piston 113 farther downwardly against the action of the spring 122 to increase the port cracking effect of the land 116, so that the net effect of the valve 84 is to maintain the fluid in the conduits 109 and 108 at a predetermined maximum pressure. In the neutral position of the selector valve piston 127, however, the land 129 of this piston blocks the port 137 for the conduit 108, so that this fluid pressure does not pass through the selector valve 82 to any of the brakes or clutches in the transmission for engaging them. The driven shaft 11 is assumed to be stationary, and the pump 81 therefore provides no output fluid pressure in its conduit 95.

Ordinary forward driving by means of the illustrated transmission is done in drive range, in which the selector valve piston 127 is in its "D" position. In this position of the piston 127, driving is initially through the intermediate speed power train, and a change in speed ratio to high speed drive may be subsequently obtained by moving the direct drive shift valve piston 149 out of its illustrated position, either manually or by any suitable automatic valve shifting means (not shown). In the "D" position of the selector valve piston 127, regulated pump pressure from the conduit 108 is conducted by means of the groove 133 and ports 137 and 138 to the conduit 148, and fluid under pressure also flows through the groove 133 and port 142 to the conduit 145. The conduit 145 is connected with the servomotor 60 for the forward drive brake 17, and the brake 17 is thus applied by application of fluid pressure to the servo piston 63. The fluid pressure in the conduit 148 flows through the port 156 in the direct drive shift valve 83 and through the groove 154 and port 157 into the conduit 160 connected with the clutch piston 53 so that the clutch 21 is also engaged. Engagement of both the clutch 21 and the brake 17 completes the intermediate speed power train, and the driven shaft 11 and the vehicle are started and are subsequently driven at increasing speeds by depressing the accelerator 167 and thereby increasing the power delivered from the engine 12.

The driven shaft pump 81, as the driven shaft 11 begins rotation and increases in speed, delivers fluid to its discharge conduit 95 and draws fluid from the sump 90 through its inlet conduit 94. The fluid pressure in the conduit 95 is impressed on the upper end of the valve piston 96 of the rear pump relief valve 85 through the conduit 123 and tends to move the valve piston 96 downwardly against the action of the spring 107. When the pressure in the conduit 95 has increased sufficiently, such movement of the piston 96 takes place, so that the land 99 of the piston 96 moves out of the cavity 106 to provide a cracking or small opening between the lower edge 106a of the cavity 106 and the upper edge 99a of the land 99 to thereby provide a limited communication between the bleed port 103 and the conduit 123. The valve piston 96 regulates the pressure to a predetermined maximum in the conduits 95 and 123, similar to the regulating action of the valve piston 113 of the pressure in the conduit 109 as previously described, tending to return to its illustrated position and close the communication between the ports 103 and 104 with any decline in pressure in the conduit 95 to reduce the fluid bleed to the sump through the port 103 and tending to open farther with any increase in pressure in the conduit 95 to increase the bleed to the sump. The valve piston 96, when so moved to vent the port 104 to the port 103 and regulate the pressure in the conduit 95, connects the ports 102 and 103, with no restriction, by means of its groove 100, and any fluid discharged by the pump 80 thus flows freely through the bleed port 103 in the valve 85 to thereby deactivate the drive shaft pump 80 and materially reduce the amount of power required for driving the pump 80. Under these conditions, with the driven shaft pump 81 supplying substantial fluid under pressure, the check valve 125 is opened by the fluid pressure in the conduits 95 and 123, with the ball 125 moving off its seat 126, and the regulated pressure in the conduits 123 and 108 is supplied by the driven shaft pump 81, exclusive of the drive shaft pump 80. Since the output conduit 91 of the drive shaft pump 80 is connected by means of the valve 85 with the bleed port 103, there is no fluid under pressure in the portion of the conduit 109 between the check valve 110 and the valve 85 tending to hold the check valve 110 open, and the check valve 110 closes with its ball moving on to the seat 112 to prevent any of the fluid in the conduit 108 draining through the groove 100 in the valve 85 and the bleed port 103 to the sump 90.

A change from second or intermediate speed drive to third speed drive is obtained by shifting the valve piston 149 from its illustrated position into a position connecting all three ports 156, 157 and 158. The valve piston may be so shifted either automatically or manually, as desired. In the changed position of the valve piston, the groove 154 of the piston provides communication between the conduit 148 containing regulated fluid pressure and the conduit 161 for thereby applying regulated pump pressure to the clutch pressure plate 57. The clutch 20 will thus be applied, and the transmission will be in direct drive.

Low speed drive through the transmission is obtained by moving the manual selector valve piston 127 into its "L" position in which the groove 133 connects the ports 137 and 142 and the groove 135 connects the ports 139 and 140. The regulated fluid pressure in the conduit 108 is supplied through the port 137, the groove 133 and the port 142 to the conduit 145 and the forward brake servomotor 60, and the brake 17 is thus applied. The fluid pressure in the conduit 145 also passes through the port 139, the groove 135, the port 140 and the conduit 144 to the low brake servomotor 61, and the brake 18 is applied by the fluid pressure on the servomotor pistons 64 and 65. With these two brakes engaged, as has been previously explained, the low speed power train through the transmission is completed. The drive shaft pump 80 produces the fluid under pressure in the fluid supply conduit 108 for engaging the brakes 17 and 18 and keeping them engaged until the driven shaft pump 81 increases to a substantial speed, the same as when the vehicle is started and driven in intermediate speed drive.

Reverse drive through the transmission is obtained by moving the manual selector valve piston 127 into its "R" position. In this position, the groove 133 in the piston 127 connects the ports 137, 136 and 143. The conduit 108 containing fluid pressure from the pump 80 is connected with the port 137, and fluid pressure is thus supplied to the conduits 147 and 146. For reverse drive, the fluid pressure in the conduit 108 is obtained from the drive shaft pump 80 exclusive of the driven shaft pump 81, since the latter pump rotates in the reverse direction and does not supply fluid to its outlet conduit 95. The fluid from the pump 80 flows through the conduits 91 and 109 to the fluid pressure supply conduit 108 as in intermediate forward drive, for example, and the front pump relief valve 84 is effective for limiting the pressure in these conduits to a predetermined maximum.

The fluid pressure in the conduit 147 connected with the conduit 108 by means of the valve piston 127 is supplied to the piston groove 117 in the valve 84 through the port 118, and the fluid pressure in this groove is effective to augment the action of the spring 122 and tend to move the valve piston 113 upwardly to decrease the amount of fluid flow between the upper end of the piston 113 and the edge of the port 119. The fluid pressure in the groove 117 is effective to supply this force to the piston 113 since the land end 116a is larger than the land end 115a as shown. The effect of this force on the front pump relief valve piston 113 is to increase the pressure in the conduit 109 and in the connected conduits to a pressure which is substantially greater than that existing in the conduit 109 and connected conduits without any such fluid pressure being supplied to the groove 117 of the piston 113, as in intermediate forward drive, for example. The reverse brake 19 is applied by fluid pressure from the conduit 146 which is connected with the conduits 108 and 109 by means of the ports 143 and 137 and the piston groove 133, and this increased pressure is supplied to the reverse brake servomotor 62 and particularly to the pistons 66 and 67 in this servomotor for applying the reverse brake 19 with a braking force which is greater than would otherwise be obtained with the fluid pressure regulated to a lower value as is used for the forward speed drives. An engagement of the brake 19, as has been previously described, completes the reverse drive power train through the transmission, and the increased force of application on the brake 19 due to the increased fluid pressure functions to prevent slippage of the brake 19 due to the reaction on the brake which is greater than the reactions on the other brakes for the forward speed drives.

The restricted passage 162 connected with the discharge conduit 95 of the driven shaft pump 81 has the function of relieving trapped fluid in the conduit 95 after movement of the driven shaft 11 for forward drives of the vehicle has ceased. The check valve 163 will remain open with its ball 164 being off the seat 165 until the fluid pressure in the conduit 95 has decreased to an insubstantial value after the pump 81 has ceased operation from forward rotation of the shaft 11. Any fluid pressure in the conduit 95 which would tend to maintain the piston 96 of the rear pump relief valve 85 in a position relieving fluid pressure in the discharge conduit 91 of the drive shaft pump 80 is thus removed, instead of being trapped in a closed system when the vehicle is stationary.

The output torque delivered by the hydraulic torque converter 14 to the ring gear 29 of the planetary gear set 15 is dependent on the speed of the impeller 22 and the engine 12 driving the torque converter. The output torque of the converter 14 increases gradually as the speed of the engine and impeller 22 increases, and when the engine 12 is running at idling speed and either the low speed forward power train or the intermediate power train is completed, the torque transmitted by the converter 14 supplies sufficient torque to the driven shaft 11 so that generally the vehicle creeps or moves slowly unless it is in some way restrained. According to my invention, I provide improved mechanism for restraining the rotation of the driven shaft 11 when the vehicle engine 12 is idling so as to overcome this tendency of the vehicle to creep whereby the vehicle operator may maintain either the intermediate or low speed power trains completed, preliminary to starting the vehicle moving by opening the engine throttle, without the necessity of braking the vehicle by means of the road wheel brakes.

The vehicle anti-creep mechanism of my invention comprises a valve 180 connected by means of a conduit 181 with the forward drive brake conduit 145, connected by means of a conduit 182 with a servomotor 183 for a brake shoe 184 and connected by means of a conduit 185 with the discharge conduit 95 of the driven shaft pump 81. The valve 180 comprises a valve piston 186 slidably disposed within a cylindrical cavity 187 formed within a casing portion 188. The piston 186 is formed with lands 189 and 190 having a groove 191 between the lands. The casing portion 188 is provided with ports 192, 193, 194 and 195, and the ports 192, 193 and 194 are respectively connected with the conduits 181, 185 and 182. The port 195 is a bleed port adapted to freely discharge fluid into the sump 90. A compression spring 196 is provided between the piston 186 and an end of the cavity 187, as shown.

The servomotor 183 comprises a piston 197 slidably disposed within a cylindrical cavity 198 in a casing portion 199. The piston 197 acts on the brake shoe 184 by means of a link 200 connected to the brake shoe at one end, the shoe being pivoted at 201 at its other end. The brake shoe 184 acts on the drum 55, which, as has been previously described, completes the reverse drive power train through the transmission when it is held stationary. The shoe 184 extends only a portion of the distance around the drum 55, as distinguished from the band 54 which extends completely around the drum 55, so that the shoe 184 provides a substantially less braking effect than does the band 54. A return spring 202 is provided between the piston 197 and a retainer ring 203 disposed in a suitable peripheral indentation in the sides of the cavity 198.

In operation, the brake shoe 184 is applied to the drum 55 whenever the vehicle is stationary and the valve piston 127 is in its "D" or "L" position to condition the transmission for either its intermediate or low speed forward drives, in which the vehicle is generally started from rest. As has been explained, fluid pressure exists in the conduit 145 when the transmission is conditioned for these drives, and fluid pressure is applied through the conduit 181 connected with the conduit 145, the port 192, the groove 191 of the piston 186, the port 194 and the conduit 182 to the servomotor 183. The piston 197 having fluid pressure thus applied thereto moves the brake shoe 184 into contact with the brake drum 55 which tends to hold the drum 55 stationary. Both the brake shoe 184 and the brake 17, as well as brake 18 in low range drive, are thus engaged. Engagement of the brake 17 either alone or with the brake 18 completes a forward drive, and the application of the brake shoe 184 to the brake drum 55 completes a reverse drive power train. The simultaneous completion of the forward and reverse power trains results in a locking up of the transmission, so that the runner 23 and all of the elements of the two gear sets 15 and 16 are locked so that they cannot rotate, and the driven shaft 11 is thus also locked. No power is thus transmitted through the transmission to cause any movement of the vehicle, and the vehicle operator need not therefore resort to use of the vehicle brakes for preventing creeping movement of the vehicle.

The transmission is started in either the low or intermediate speed forward drives by depressing the vehicle accelerator 167 to cause a greater driving action and torque output by the vehicle engine 12. The brake shoe 184 has less braking and power train completing action than the brakes 17 and 19 due to its smaller size, the fact that the same pressure is impressed on its piston 197 as on the piston 68 rather than the increased pressure provided on the reverse brake pistons 66 and 67 for completing the usual reverse drive, and the fact that only the one piston 197 is used instead of the two pistons 66 and 67 for braking action on the reverse drum 55. The brake shoe 184 thus slips on its drum 55, and the forward drive power train through the transmission causes the driven shaft 11 to move in the forward direction with a resultant movement of the automotive vehicle. The brake shoe 184 remains applied until the vehicle movement increases to a predetermined low speed, for example, 3 miles per hour.

The pressure in the conduit 95 supplied from the driven shaft pump 81 increases as the speed of the vehicle increases, and this pressure is supplied through the conduit 185 and the port 193 to the right end of the valve piston 186. When the vehicle reaches this predetermined speed, the pressure on the right end of the valve piston 186 moves the piston 186 to the left against the action of the spring 196 so that the groove 191 connects the ports 194 and 195, and the land 190 blocks the port 192. The conduit 182 and thereby the servomotor 183 are drained to the sump through the port 194, the groove 191, and the port 195, and the return spring 202 is effective to disengage the brake shoe 184 from the drum 55, so that the driven shaft 11 is thereafter driven without impediment. The brake shoe 184 remains disengaged from the drum 55 as long as the vehicle travels above this predetermined speed, with the pressure from the driven shaft pump 81 being sufficient to hold the valve piston 186 to the limit of its movement to the left against the action of the spring 196.

The embodiment of the invention illustrated in Fig. 5 is the same as that shown in Fig. 1 with the exception that the brake shoe 184, instead of being applied to the brake drum 55, is instead applied on a drum 204 connected with the ring gear 29 and with the runner or driven element 23 of the hydraulic torque converter 14. The brake shoe 184 in this case functions in the same manner as in the other embodiment, but, instead of preventing undesired rotation of the driven shaft 11 by completing a reverse drive power train while a forward drive power train is simultaneously completed by the brake 17, the shoe 184 directly brakes the driven element 23 of the hydraulic torque converter 14 and prevents a rotation of this element while the impeller 22 of the torque converter 14 is being rotated at a relatively slow speed under idling conditions of the vehicle engine 12. When the engine 12 is increased in speed by opening the engine throttle, the impeller 22 rotates at the faster engine speed and transmits greater power to the runner 23 and causes it to rotate against the action of the brake shoe 184 which slips. When the vehicle starts to move, the valve 180 is effective to cause a disengagement of the brake shoe on the drum 204 in the same manner as it is disengaged from the drum 55 in the first embodiment of the invention.

My improved vehicle anti-creep braking system advantageously causes a braking of the vehicle when the transmission of the vehicle is conditioned for a start in a forward drive, so that the hydraulic torque converter of the transmission is not then effective. The anti-creep system causes an automatic discontinuance of the braking effect when the vehicle starts to move.

I wish it to be understood that my invention is not to be limited to the specific constructions and arrangements shown and described, except only insofar as the claims may be so limited, as it will be understood to those

I claim:

1. In transmission mechanism for an automotive vehicle having a driving engine, the combination of a drive shaft adapted to be driven by the vehicle engine, a driven shaft adapted to drive the vehicle, means for providing a power train between said shafts and including a hydrodynamic coupling device for transmitting power through the train, said last named means also including a brake drum and a brake band engageable with the drum for completing the train, and means responsive to the speed of the vehicle for temporarily holding said driven shaft from rotation due to torque transmitted through said hydrodynamic device and power train at vehicle engine idling speeds and including means for simultaneously completing a second different power train between said shafts, said last named means including a brake shoe engageable with a second drum for providing a limited braking action on the latter drum whereby an increase of power from said driving engine causes said driven shaft to be driven by means of said first power train and said brake shoe to slip on said second drum for breaking said second power train.

2. In transmission mechanism for an automotive vehicle having a driving engine, the combination of a drive shaft adapted to be driven by the vehicle engine, a driven shaft adapted to drive the vehicle, means for providing a power train between said shafts and including a hydrodynamic coupling device for transmitting power through the train, said last named means also including a brake drum and a brake band engageable with the drum for completing the train, means for temporarily holding said driven shaft from rotation due to torque transmitted through said hydrodynamic device and power train at vehicle engine idling speeds and including means for simultaneously completing a second different power train between said shafts, said last named means including a brake shoe engageable with a second drum for providing a limited braking action on the drum whereby an increase of power from said driving engine causes said driven shaft to be driven by means of said first power train and said brake shoe to slip on its brake drum for breaking said second power train, and means responsive to the speed of the vehicle for maintaining said brake shoe disengaged from its respective drum above a predetermined speed of said vehicle.

3. In transmission mechanism for an automotive vehicle having a driving engine, the combination of a drive shaft adapted to be driven by the vehicle engine, a driven shaft adapted to drive the vehicle, means for providing a power train between said shafts and including a hydrodynamic coupling device for transmitting power through the train, said last named means also including a brake drum engageable by a brake band for completing the power train, means responsive to the speed of the vehicle for temporarily holding said driven shaft from rotation due to torque transmitted through said hydrodynamic device and power train at vehicle engine idling speeds and including means for simultaneously completing a reverse drive power train between said shafts, said last named means including a brake drum and a brake shoe engageable with only one side of said last named drum for providing a limited holding action on the drum whereby the driven shaft may be driven my means of the forward drive power train by increasing the power output of said driving engine and said brake shoe slips on its respective brake drum for breaking the reverse power train.

References Cited in the file of this patent

UNITED STATES PATENTS

| | | |
|---|---|---|
| 1,673,863 | Brown | June 19, 1928 |
| 2,080,067 | Stucatur | May 11, 1937 |
| 2,195,605 | Thompson | Apr. 2, 1940 |
| 2,221,393 | Carnegie | Nov. 12, 1940 |
| 2,559,922 | Alspaugh | July 10, 1951 |
| 2,566,518 | Farkas | Sept. 4, 1951 |
| 2,572,310 | Brown | Oct. 31, 1951 |
| 2,599,215 | Wemp | June 3, 1952 |
| 2,631,700 | Long et al. | Mar. 17, 1953 |
| 2,645,137 | Roche | July 14, 1953 |